Figure 1:
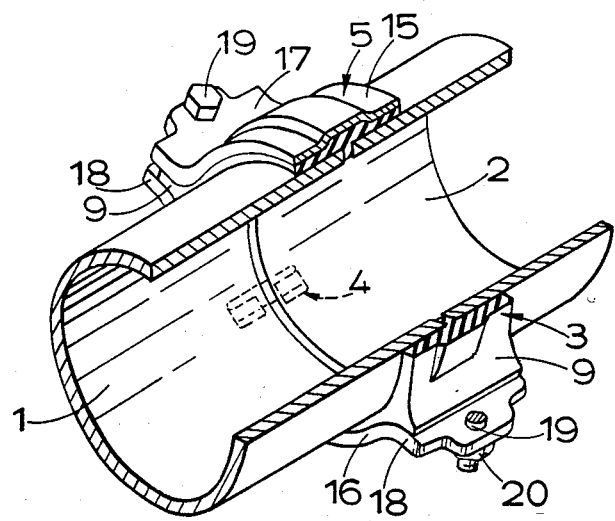

United States Patent [19]

Jones

[11] Patent Number: 4,659,870

[45] Date of Patent: Apr. 21, 1987

[54] SOCKET-LESS PIPE JOINTS

[75] Inventor: Conrad D. Jones, Shrewsbury, England

[73] Assignee: Glynwed Consumer & Building Products Limited, England

[21] Appl. No.: 730,684

[22] Filed: May 3, 1985

[30] Foreign Application Priority Data

May 5, 1984 [GB] United Kingdom ............... 8411590

[51] Int. Cl.$^4$ ..................... H01R 4/26; H01R 4/38; F16L 17/04
[52] U.S. Cl. ................... 174/84 S; 285/373; 285/383
[58] Field of Search ............. 174/84 S, 85; 277/235; 285/373, 105, 256, 259, 240, 383, 104, 328, 258

[56] References Cited

U.S. PATENT DOCUMENTS

| | | | |
|---|---|---|---|
| 2,273,398 | 2/1942 | Couty et al. | 285/256 X |
| 2,376,017 | 5/1945 | Smallpeice | 277/235 X |
| 2,753,392 | 7/1956 | Hebeler | 174/84 S |
| 2,796,457 | 6/1957 | Stinger | 277/235 X |
| 2,966,539 | 12/1960 | Sears et al. | 174/84 S X |
| 3,116,078 | 12/1963 | Scherer | 285/373 X |
| 3,217,092 | 11/1965 | Sakurada | 174/84 S X |
| 3,453,006 | 7/1969 | Levake | 285/104 |
| 3,479,066 | 11/1969 | Gittleman | 285/373 X |

FOREIGN PATENT DOCUMENTS

| | | | |
|---|---|---|---|
| 852854 | 3/1940 | France | 285/383 |
| 538190 | 5/1976 | U.S.S.R. | 174/84 S |

Primary Examiner—Dave W. Arola
Attorney, Agent, or Firm—Oldham, Oldham & Weber Co.

[57] ABSTRACT

To provide an electrically conductive path between metal pipes, e.g. soil or drain pipes, connected at butting ends by means of an annular gasket of electrically insulating material which fits around and spans the butting ends and is secured in sealing engagement with the butting ends by clamp, a bridge element of electrically conductive material retained to the gasket extends between and engages with the pipes. The bridge element is conveniently an attachment to the gasket having portions disposed at internal and external circumferential surfaces of the gasket. Teeth or like formations on the bridge element dig into the surfaces of the pipes to enhance the engagement. Electrically conductive engagement may also be made with the clamp at a portion of the bridge element at the exterior of the gasket.

13 Claims, 7 Drawing Figures

U.S. Patent  Apr. 21, 1987  Sheet 1 of 2  4,659,870

SOCKET-LESS PIPE JOINTS

This invention relates to socket-less pipe joints which connect pipes in butting end to end relationship, and more particularly to such joints as applied to metal pipes. The joints may be used, for example, in drain, soil, waste and vent pipe, and water supply pipe, runs.

As used herein, the term "pipe" is intended to include not only pipes, tubes and the like but also hollow fittings, such as bends, elbows and T junctions, which are incorporated in pipe runs.

It is desirable for pipe runs composed of metal pipes which extend into, or are in, the ground to have electrical continuity so that they can provide a means of earthing. The necessary electrical continuity is readily afforded in pipe runs, for example soil stacks, in which metal pipes are connected together by spigot and socket joints, commonly caulked with lead, because of the metal to metal contact between the pipes at the joints. However, there is not the required electrical continuity in pipe runs in which pipes are connected by socket-less joints known hitherto of the kind in which annular gaskets of rubber, plastics or other electrically insulating material are fitted to butting ends of adjacent pipes and clamps are applied around the gaskets to secure them in sealing engagement with the pipes. In general, therefore, such pipe runs have not been able to provide the necessary electrical continuity to earth. We are aware of instances where, because of that, pipe runs with spigot and socket joints have been used even though pipe runs with socket-less joints might have been installed more easily and more cheaply.

The present invention is concerned with providing electrical continuity between pipes connected by a socket-less pipe joint of the kind referred to.

According to one aspect of the present invention a socket-less pipe joint is provided between butting ends of metal pipes, comprising an annular gasket of electrically insulating material which fits around and spans the butting pipe ends, clamping means applied around the gasket to secure the gasket in sealing engagement with the butting pipe ends, and a bridge element of electrically conductive material which extends between the pipes and is adapted to provide an electrically conductive path between them.

According to a second aspect of the present invention there is provided a bridge element of electrically conductive material constructed and arranged to be attached to a gasket of a socket-less pipe joint which is to be secured in sealing engagement with butting ends of metal pipes by clamping means applied around the gasket, and having portions adapted to be engaged with the pipes adjacent to an internal circumferential surface of the gasket thereby to provide an electrically conductive path between the pipes.

The clamping means may be made of, or include parts of, electrically conductive material, and the bridge element is preferably then adapted also to provide an electrically conductive path between the pipes and the clamping means.

Preferably the bridge element extends between the pipes, and, when so adapted, is connected to the clamping means, within the length of the gasket. It may thus be relatively short because it does not have far to extend from one pipe end to the other. It may be substantially shorter than the axial length of the gasket, whereas if the bridge element were to be arranged to extend externally of the gasket between the pipes it would have to be longer than the gasket.

Preferably the bridge element is retained securely to the gasket thereby to be automatically correctly positioned for engagement with the pipe ends, and with the clamping means when adapted to be engaged therewith, by the gasket when the gasket is applied to the pipe ends for use. The bridge element may be attached to the gasket or it may be moulded into the gasket during the forming of the gasket. It is preferred that it is made to be applied to the gasket as the gasket may then be of a known form and have the bridge piece applied to it with little or no modification of that form. It will be appreciated that this enables the present invention to be put into effect readily and cheaply.

In a preferred form the bridge element is made as a strip which is substantially rigid and is attached to the gasket in the manner of a staple, an intermediate portion of the strip being disposed on the exterior of the gasket at an intermediate part thereof for engagement with the clamping means, and end portions of the strip opening through the wall of the gasket to the interior of the gasket where they lie against the wall, for respective engagement with the pipe ends. It is possible for this to be done without impairing the ability of the gasket to provide a satisfactory seal between the pipe ends. For example, in respect of a known gasket having spaced groups of sealing ribs on its internal surface which engage with the external surfaces of the pipes at positions spaced from the butting pipe ends, the bridge element may be positioned on the gasket at the intervening portion thereof between the groups of sealing ribs. The end portions of the bridge element may be forced through the wall of the gasket so that they make their own passage through the wall, or holes may be moulded into, punched or otherwise formed in the wall for the end portions to pass through.

The bridge element preferably has teeth or like formations which can dig into the surfaces of the pipes to ensure a good engagement with the pipe for electrical connection of the bridge element to the pipes. Pipes to which the joint is applied will usually be painted, or have other suitable protective coatings, and the teeth or like formations are desirable for penetrating the coating to reach the bare metal of the pipes and saving the fitter the task of removing the coating from the relevant parts of the pipes before the joint is made. Where the bridge element is to engage the clamping means as well it may similarly have teeth or like formation to dig into a suitable surface or surfaces of the clamping means. The bridge element may be corrugated to enhance its strength.

It is desirable for the bridge element to be of a corrosion resistant material. Stainless steel is a suitable material which combines good corrosion resistance with satisfactory electrical conductivity.

More than one bridge element may be incorporated in the joint.

Figure 2:
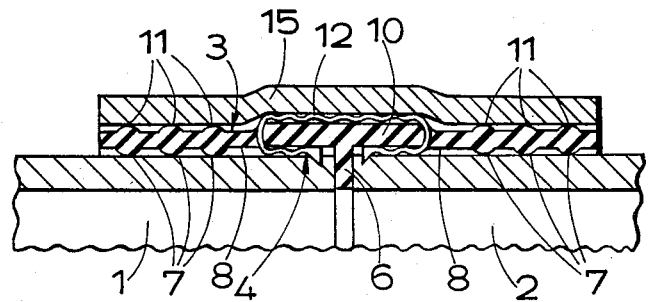
Figure 3:
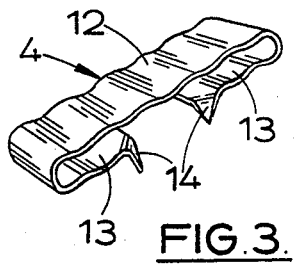
Figure 4:
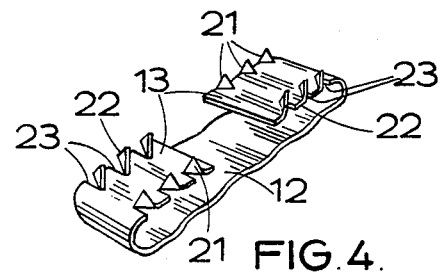
Figure 5:
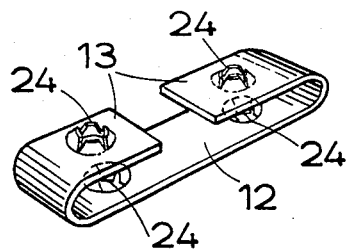
Figure 6:
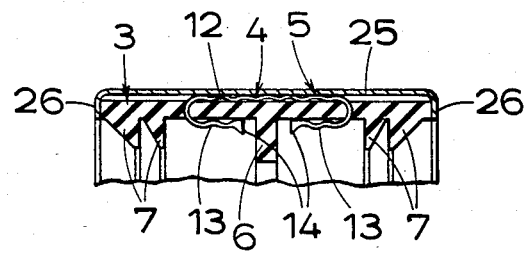
Figure 7:
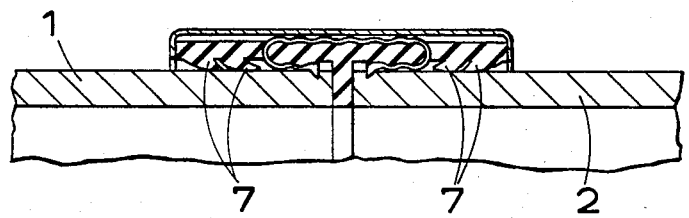

Embodiments of the invention will now be described by way of example only with reference to the accompanying drawings, in which FIG. 1 is a perspective view partly cut away of a socket-less pipe joint in accordance with the present invention, FIG. 2 is an enlarged fragmentary sectional view of part of the joint, FIG. 3 is a perspective view of a bridge element of the joint, FIG. 4 is a perspective view of a modified form of the bridge element, FIG. 5 is a perspective view of a further modified form of the bridge element, and FIGS. 6 and 7 are enlarged fragmentary sectional views of part of another socket-less pipe joint in accordance with the invention before and after pipes are connected.

Referring to the embodiment illustrated by FIGS. 1 to 3 of the drawings, the socket-less pipe joint comprises two plain-ended, metal pipes 1, 2, for example cast-iron pipes of a soil pipe stack, of similar diameters arranged in co-axial butting relationship, an annular sealing gasket 3 fitted around the adjacent pipe ends, a bridge element 4 within the gasket extending between the two pipes, and a clamp 5 secured around the gasket.

The gasket 3 is of a known form, being made as a moulding from a suitable flexible synthetic rubber or other insulating material. It has an integral internal intermediate annular rib 6, FIG. 2, of rectangular section, which fits between the end faces of the adjacent pipe ends, groups of shallower internal annular ribs 7 of part-circular section spaced at either side of the intermediate rib with intervening plain annular internal surface portions 8 between the intermediate rib 6 and each group of the shallower internal ribs 7, and two diametrically opposed, external ears 9 extending along the length of the gasket parallel to the axis of the gasket. The ears 9 taper radially outwardly. Extending circumferentially between the ears 9 the gasket has at its external surface integral broad, raised central bands 10, and at either side of the central bands groups of ribs 11 of similar part-circular section to and directly opposite the shallower internal ribs 7.

As shown in FIG. 3, the bridge element 4 is made from a strip of sheet stainless steel which is bent to narrow elongated C shape having a central portion 12 and two returned end portions 13 extending substantially parallel to but spaced from the central portion. The strip is laterally corrugated throughout its length. The corners at the extremities of the end portions 13 are bent to form triangular teeth 14 which project away from the central portion 12. The teeth 14 project from the end portions a distance greater than the radial projection of the shallower internal ribs 7 from the internal surface of the gasket.

For use the bridge element 4 is attached to the intermediate portion of the gasket, as best seen in FIG. 2, at a position angularly spaced from the ears 9, the central portion 12 extending across one of the raised central bands 10 at the exterior of the gasket and the end portions 13 passing through the wall of the gasket and lying against the internal surface of the gasket at the plain surface portions 8 at opposite sides of the intermediate rib 6. The teeth 14 of the end portions 13 project inwardly from the internal surface of the gasket further than the shallower ribs 7.

It will be seen from the drawings that the bridge element has the general appearance of an applied paper staple. The bridge element may be applied to the gasket in the manner of a staple by a tool specially adapted for the purpose. A clip of the bridge elements separably connected together may be provided for use with the tool. With the aid of the tool it is possible that the bridge element may be applied to the gasket by the person assembling the pipes on site as he is about to fit the gasket. The bridge element may, of course, be pre-applied to the gasket instead, if preferred.

The clamp 5 comprises two similar semi-circular members 15 and 16 which have outwardly-directed, generally radial flanges 17 and 18 respectively, FIG. 1, at their ends at which the members are connected together by screws 19 passed through plain holes in the flanges 17 and 18 of the semi-circular members and fitted with retaining nuts 20. The semi-circular members 15, 16, screws 19 and nuts 20 are all made of steel. As will be seen in FIG. 1, the ears 9 of the gasket are disposed between the flanges 17, 18 of the semi-circular members and the screws extend between the flanges radially beyond the ears. The semi-circular members 15 and 16 are of a width substantially equal to the axial length of the gasket and together they substantially enclose the gasket. They are correctly located on the gasket by co-operation of the raised central bands 10 of the gasket with central complementary internal recesses 21 extending annularly in the semi-circular members.

For assembly of the joint, the bridge element having been applied to the gasket, the pipes 1, 2 are entered into the opposite ends of the gasket until their end faces abut against the intermediate rib 6. The end portions 13 of the bridge element respectively lie against the pipes adjacent to the intermediate rib, the teeth 14 engaging the surfaces of the pipes. As the clamp is subsequently tightened about the gasket by tightening the screws 19 at the flanges 17, 18 of the semi-circular members 15 and 16 the gasket is sealingly compressed onto the pipes. During the tightening of the clamp the end portions of the bridge element are urged tightly against the pipes and their teeth 14 dig into the surfaces of the pipes. Also one of the semi-circular members 15, 16 of the clamp over-lies and is urged tightly against the central portion 12 of the bridge element.

Thus the bridge element is connected to the pipes such that it is able to provide electrical continuity between the pipes connected by the joint. In addition, by its direct engagement with the one semi-circular member 15, 16 and the connection of the other semi-circular member to that member by the screws and nuts, there is electrical continuity between the pipes and clamp as well.

The bridge element does not interfere with the sealing of the gasket to the pipes because it is applied to the intermediate portion of the gasket axially inwardly of the shallower internal ribs 7.

Modified forms of the bridge element are shown in FIGS. 4 and 5 of the accompanying drawings. In each case the element is again made from a substantially rigid strip of stainless steel bent to a narrow elongated C shape having a central portion 12 and returned end portions 13. In the form shown in FIG. 4 the strip is laterally corrugated. Instead of bending their corners to provide teeth, the end portions have teeth 21 formed along their longitudinal edges 22 directed away from the central portion. The teeth 21 are formed by cutting slits 23 perpendicularly into the longitudinal edges at spaced intervals along the edges and bending back one of the corners of the intervening material adjacent each slit. The toothed longitudinal edges 22 are able to dig into the surfaces of the pipes to connect the bridge element to the pipes for transfer of electric current from one pipe to the other. The longitudinal edges may alternatively be serrated. In the form shown in FIG. 5 the strip is flat and has teeth-like formations 24 in the central portion 12 and each end portion 13 produced by piercing the strip such that holes are made with jagged edges which protrude from one surface of the strip.

These formations 24 are conveniently provided whilst the strip is in the plain flat state before being bent to the C-shape.

The further embodiment illustrated by FIGS. 6 and 7 of the drawings will now be described. Parts corresponding to those of the foregoing embodiment are identified by the same reference numerals. The socket-less pipe joint differs from the foregoing embodiment in the forms which the annular sealing gasket 3 and clamp 5 take, both being of known forms.

The gasket 3, made of flexible synthetic rubber or other insulating material, has a plain cylindrical exterior. From its internal surface project an annular intermediate rib 6 of rectangular section and pairs of shallower ribs 7 adjacent the ends of the gasket, each of the latter ribs being of right-angled triangular shape having the hypotenuse sloping axially inwardly of the gasket.

Clamp 5 comprises a stainless steel band 25 bent to almost a closed circular form and which has its circumferential edges 26 turned radially inwardly a distance slightly greater than the wall thickness of the gasket. Opposite ends of the band 25, not shown, are bent radially outwards to form flanges which are connected by clamping screws, not shown, for drawing the flanges together to contract the band radially. The band fits about the gasket 3. Its inturned circumferential edges 26 overlap the ends of the gasket to retain the gasket within the band. The gap between the flanged ends of the band is spanned by an arcuate plate, not shown, which is fixed to the inside of the band at one of the ends and slidingly lies against the inside surface of the other end. Thus when the band is contracted on the gasket the entire circumference of the gasket is subjected to compressive force.

A bridge element 4 made from substantially rigid stainless steel strip is fixed to the gasket 3. As illustrated the bridge element is similar to that shown in FIGS. 2 and 3 but it may take one of the other forms described above and illustrated. The bridge element is applied to the intermediate portion of the gasket such that its central portion 12 is at the outside of the gasket, lying on the external surface, and its end portions 13 are at the inside of the gasket against the internal surface at opposite sides of the intermediate rib 6. Teeth 14 of the end portions 13 project inwardly towards the centre of the gasket.

In assembling the joint, the bridge element 4 having first been fixed to the gasket and the clamp loosely fitted on the gasket, the pipes 1, 2 to be connected are entered into the opposite ends of the gasket until their end faces abut against the intermediate rib, as shown in FIG. 7. The ribs 7 at the ends of the gasket are deflected axially inwardly of the gasket and grip the pipes as the pipes are pushed past them. The end portions 13 of the bridge element respectively lie on the pipes and their teeth 14 engage the surfaces of the pipes. As the band 25 of the clamp is tightened about the gasket the gasket is sealingly compressed on to the pipes and the bridge element is urged tightly against the pipes, the teeth 14 digging into the pipes. The band is urged against the central portion 12 of the bridge element. Electrical continuity is thereby established by the bridge element between the pipes and between the clamps and the pipes.

What is claimed is:

1. A socket-less pipe joint between butting ends of two metal pipes comprising:

a tubular gasket of flexible electrically insulating material having internal and external circumferential surfaces and which is fitted over and spans said butting ends, there being an internal intermediate annular rib projecting from said internal circumferential surface which fits between and is abutted by said butting ends and further internal annular ribs which project from said internal circumferential surfaces, are spaced from said intermediate annular rib towards the opposite ends of said gasket and sealingly engage circumferentially around said butting ends;

a bridge element of electrically conductive material being of substantially rigid strip form of a width substantially less than the circumference of said gasket and attached to said gasket longitudinally thereof, and having an intermediate portion which is disposed at said external circumferential surface and end portions which extend through the material of said gasket, lie against said internal circumferential surface at opposite sides of said intermediate annular rib, between that rib and said further internal annular ribs, in engagement with said butting ends; and clamping means substantially co-extensive with said gasket extending circumferentially about said gasket, bearing on said intermediate portion of said bridge element and compressively sealing said gasket around said butting ends and urging said end portions of said bridge element into engagement with said butting ends, the construction and arrangement being such that said bridge element provides an electrically conductive path between said pipes without interfering with the fit of said intermediate annular rib between said butting ends and the integrity of the circumferential sealing engagement of said further internal annular ribs with said butting ends.

2. A socket-less pipe joint according to claim 1 wherein said clamping means includes a part of electrically conductive material which bears on said intermediate portion of said bridge element such that an electrically conductive path is provided between said pipes and said clamping means.

3. A socket-less pipe joint according to claim 1 wherein said end portions of said bridge element have sharp-edged formations which protrude therefrom away from said intermediate portion and dig into surfaces of said butting ends.

4. A socket-less pipe joint according to claim 3 wherein said sharp-edged formations comprise corners of said end portions bent to form teeth which protrude from said end portions away from said intermediate portion.

5. A socket-less pipe joint according to claim 3 wherein said sharp-edged formations comprise teeth formed at edges of said end portions, there being slits in said edges and the material of said strip adjacent to said slits being bent to form said teeth.

6. A socket-less pipe joint according to claim 3 wherein said sharp-edged formations are protruding jagged edges of holes pierced out of said strip.

7. A socket-less pipe joint according to claim 1 wherein said bridge element has corrugations extending laterally thereof at said intermediate portion and said end portions.

8. A bridge element constructed and arranged to be attached to a tubular gasket of flexible electrically insulating material which has internal and external circumferential surfaces, fits over and spans butting ends of two metal pipes, has an internal intermediate annular rib projecting from the internal circumferential surface which fits between and is abutted by the butting ends and further internal annular ribs which are spaced from the intermediate rib towards opposite ends of the gasket and project from the intended circumferential surface to sealingly engage circumferentially around the butting ends, and which gasket is compressed into sealing engagement with the butting ends by clamping means substantially coextensive with the gasket applied circumferentially about the gasket to secure the butting ends of the pipes together in sealed relationship;

said bridge element being of electrically conductive material in the form of a substantially rigid strip of a width substantially less than the circumference of the gasket having an intermediate portion and opposite end portions and having at said end portions sharp-edged formations which protrude from a surface thereof, and said bridge element being adapted to be attached longitudinally of the gasket with said intermediate portion lying on the external circumferential surface of the gasket where it is engageable by the clamping means, and with said end portions bent to extend through the material of the socket and then lie against the internal circumferential surface of the gasket substantially parallel to said intermediate portion at opposite sides of the intermediate annular rib of the socket, between that rib and the further internal ribs, in contact with the butting ends of the pipes and with said sharp-edged functions protruding away from said intermediate portion so as to be able to dig into the surfaces of the pipes, thereby to provide an electrically conductive path between the pipes without interfering with the fit of the intermediate rib of the gasket between the butting ends and the integrity of the circumferential sealing engagement of the further internal annular ribs with the butting ends.

9. A bridge element according to claim 8 wherein said sharp-edged formations comprise corners of said end portions which are bent to form teeth which protrude from said end portions.

10. A bridge element according to claim 8 wherein said sharp-edged formations comprise teeth formed at edges of said end portions, there being slits in said edges and the material of said strip adjacent to said slits being bent to form said teeth.

11. A bridge element according to claim 8 wherein said sharp-edged formations are protruding jagged edges of holes pierced out from said strip at said end portions.

12. A bridge element according to claim 8 wherein said strip is formed with corrugations which extend laterally of said strip.

13. A bridge element according to claim 8 wherein said intermediate portion has sharp-edged formations which protrude therefrom and are intended to dig into a surface of the clamping means.

* * * * *